US009304656B2

(12) United States Patent  
Kroeger et al.

(10) Patent No.: US 9,304,656 B2  
(45) Date of Patent: Apr. 5, 2016

(54) SYSTEMS AND METHOD FOR OBJECT SELECTION ON PRESENCE SENSITIVE DEVICES

(71) Applicant: Google Inc., Mountain View, CA (US)

(72) Inventors: Robert John Kroeger, Kitchener (CA); Fady Samuel, Kitchener (CA); Varun Jain, Kitchener (CA)

(73) Assignee: GOOGLE INC., Mountain View, CA (US)

( * ) Notice: Subject to any disclaimer, the term of this patent is extended or adjusted under 35 U.S.C. 154(b) by 245 days.

(21) Appl. No.: 13/853,557

(22) Filed: Mar. 29, 2013

(65) Prior Publication Data

US 2014/0137039 A1    May 15, 2014

Related U.S. Application Data

(60) Provisional application No. 61/618,312, filed on Mar. 30, 2012.

(51) Int. Cl.
*G06F 3/0488* (2013.01)
*G06F 3/0481* (2013.01)
*G06F 3/0484* (2013.01)

(52) U.S. Cl.
CPC ........ *G06F 3/04817* (2013.01); *G06F 3/04842* (2013.01); *G06F 3/04883* (2013.01)

(58) Field of Classification Search
None
See application file for complete search history.

(56) References Cited

U.S. PATENT DOCUMENTS

| 5,509,114 | A  | * | 4/1996  | Moran et al. | 345/443 |
| 5,694,532 | A  | * | 12/1997 | Carey et al. | 345/419 |
| 6,883,145 | B2 | * | 4/2005  | Jaeger       | 715/767 |
| 7,299,424 | B2 | * | 11/2007 | Jarrett et al. | 715/863 |
| 8,448,083 | B1 | * | 5/2013  | Migos et al. | 715/781 |
| 2003/0179235 | A1 | * | 9/2003 | Saund et al. | 345/764 |
| 2009/0100383 | A1 | * | 4/2009 | Sunday et al. | 715/863 |
| 2010/0185949 | A1 | * | 7/2010 | Jaeger | 715/730 |
| 2010/0251189 | A1 | * | 9/2010 | Jaeger | 715/863 |
| 2011/0302532 | A1 | * | 12/2011 | Missig | 715/823 |
| 2012/0026100 | A1 | * | 2/2012 | Migos et al. | 345/173 |

* cited by examiner

*Primary Examiner* — Matt Kim
*Assistant Examiner* — Mahelet Shiberou
(74) *Attorney, Agent, or Firm* — Troutman Sanders LLP; James E. Schutz; Christopher C. Close, Jr.

(57) ABSTRACT

Certain implementations of the disclosed technology may include systems and methods for object selection on presence-sensitive devices. According to an example implementation, a method is provided for outputting, by a computing device and for display, a view containing a first selectable object and a second selectable object; initiating a gesture selection mode in response to receipt of a selection gesture; receiving respective indications of a swipe gesture sequence; outputting, for display, an indication that the first and second selectable objects are selected in response to determining that a first portion of the swipe gesture sequence encircled the first and second selectable objects; and outputting, for display, an indication that the first selectable object is selected and the second selectable object is unselected in response to determining that a second portion of the swipe gesture sequence encircled the first selectable object and did not encircle the second selectable object.

24 Claims, 8 Drawing Sheets

SYSTEMS AND METHOD FOR OBJECT SELECTION ON PRESENCE SENSITIVE DEVICES

RELATED APPLICATIONS

This application is related to provisional application Ser. No. 61/618,312, filed on Mar. 30, 2012, entitled: "Text Selection Gesture for Touch Screen," the contents of which are hereby incorporated by reference in their entirety.

BACKGROUND

Device with presence-sensitive input functionality, including touch screen devices, are increasingly becoming more common. Presence-sensitive displays, for example, can be configured to detect the contact of a stylus, or a touch of a user's finger against a screen. Modern presence-sensitive devices and displays, also allow a user to make natural gestures, such as those used in the process of handwriting. Presence-sensitive devices can be used in conjunction with a processor to recognize the user's gesture and the processor may register a corresponding response. For example, a user may perform a long-tap gesture or a double-tap gesture, which may signal the processor to enter a selection mode to allow selection and/or manipulation of the text or objects.

One disadvantage of using a finger or other broad-tipped stylus device in conjunction with a presence-sensitive device is that it can be difficult to target accurately and select accurately the desired text or object. In systems that have a presence-sensitive input device combined with a display, it can be difficult to accurately target and highlight displayed text or objects so that they may be selected and/or manipulated. In addition, if a user begins selecting an unintended portion of text or object, it can be inconvenient to make corrections, and modifications to correct the mistakenly selected text or object usually require another gesture or repeating the initial gesture.

SUMMARY

Some or all of the above needs may be addressed by certain implementations of the disclosed technology. Certain implementations may include systems and methods for object selection on a presence-sensitive screen.

According to an example implementation, a computer-implemented method is provided that includes outputting, by a computing device and for display, a view containing a first selectable object and a second selectable object; receiving, by the computing device, an indication of a selection gesture; initiating, by the computing device, a gesture selection mode in response to receipt of the selection gesture; receiving, by the computing device, respective indications of a swipe gesture sequence; outputting, for display, an indication that the first selectable object and the second selectable object are selected in response to determining that a first portion of the swipe gesture sequence encircled the first selectable object and the second selectable object; and outputting, for display, an indication that the first selectable object is selected and the second selectable object is unselected in response to determining that a second portion of the swipe gesture sequence encircled the first selectable object and did not encircle the second selectable object.

According to an example implementation, another computer-implemented method is provided that includes outputting, by a computing device and for display, a view containing a first selectable object and a second selectable object; receiving, by the computing device, an indication of a selection gesture; initiating, by the computing device, a gesture selection mode in response to receipt of the selection gesture; receiving, by the computing device, respective indications of a swipe gesture sequence; outputting, for display, an indication that the first selectable object is selected in response to determining that a first portion of the swipe gesture sequence encircled the first selectable object; and outputting, for display, an indication that the first selectable object and the second selectable object is selected in response to determining that a second portion of the swipe gesture sequence encircled the first selectable object and the second selectable object.

According to an example implementation, as system is provided. The system includes a presence-sensitive display; one or more processors in communication with the presence-sensitive display; and at least one memory in communication with the one or more processors and configured for storing data and instructions that, when executed by the at least one processor, cause the system to output, for display, a view including a first selectable object and a second selectable object; receive an indication of a selection gesture; initiate a gesture selection mode in response to receipt of the selection gesture; receive respective indications of a swipe gesture sequence; output, for display, an indication that the first selectable object is selected in response to determining that a first portion of the swipe gesture sequence encircled the first selectable object; output, for display, an indication that the first selectable object and the second selectable object are selected in response to determining that a first portion of the swipe gesture sequence encircled the first selectable object and the second selectable object; output, for display, an indication that the first selectable object and the second selectable object is selected in response to determining that a second portion of the swipe gesture sequence encircled the first selectable object and the second selectable object; and output, for display, an indication that the first selectable object is selected and the second selectable object is unselected in response to determining that a second portion of the swipe gesture sequence encircled the first selectable object and did not encircle the second selectable object.

According to an example implementation, a computer-readable medium is provided that stores instructions that, when executed by at least one processor in a system, cause the system to perform a method. The method includes outputting for display, a view including a first selectable object and a second selectable object; receiving an indication of a selection gesture; initiating a gesture selection mode in response to receipt of the selection gesture; receiving respective indications of a swipe gesture sequence; outputting, for display, an indication that the first selectable object is selected in response to determining that a first portion of the swipe gesture sequence encircled the first selectable object; outputting, for display, an indication that the first selectable object and the second selectable object are selected in response to determining that a first portion of the swipe gesture sequence encircled the first selectable object and the second selectable object; outputting, for display, an indication that the first selectable object and the second selectable object is selected in response to determining that a second portion of the swipe gesture sequence encircled the first selectable object and the second selectable object; and outputting, for display, an indication that the first selectable object is selected and the second selectable object is unselected in response to determining that a second portion of the swipe gesture sequence encircled the first selectable object and did not encircle the second selectable object.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIG.S

Reference will now be made to the accompanying FIG.s and flow diagrams, which are not necessarily drawn to scale, and wherein.

DETAILED DESCRIPTION

Figure 1A:
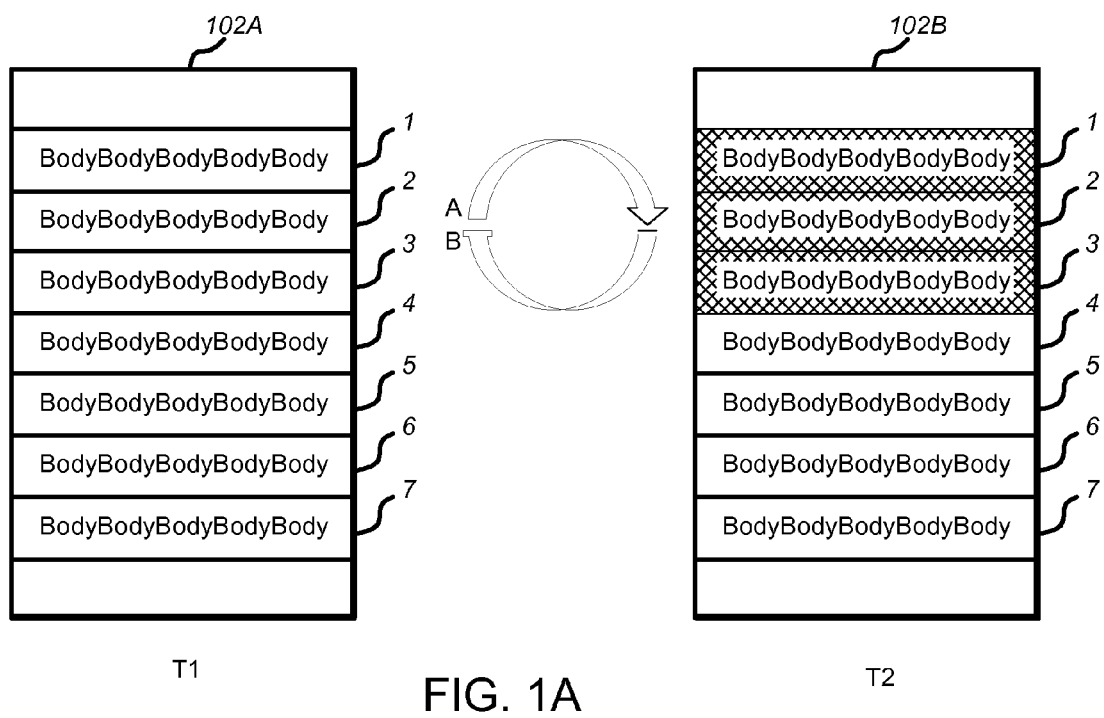
FIG. 1A is an illustrative display view transformation before (T1) and after (T2) performing a selective operation, according to an example embodiment of the disclosed technology.

Some implementations of the disclosed technology will be described more fully hereinafter with reference to the accompanying drawings. This disclosed technology may, however, be embodied in many different forms and should not be construed as limited to the implementations set forth herein.

Example implementations of the disclosed technology provide systems and methods for selecting objects associated with a graphical user interface. Certain implementations may further provide convenient methods for refining the selection of objects, for example, to exclude objects that were selected by mistake, or to include additional objects. An illustrative example of the disclosed technology may be utilized with computing devices having a combined display screen and presence-sensitive device, such as a touch screen. Implementations of the disclosed technology may also be used to enable presence-sensitive devices (such as depth cameras, for example) that are not necessarily combined or physically attached to a display screen.

In the example of the touch screen, an according to an example implementation, a user's finger or stylus may be used to initiate an object selection mode, for example, by a quick double tap, or a tap and hold, etc. In an example implementation, after the selection mode has been initiated, respective indications of a swipe gesture sequence may be received to indicate a desired selection of objects that are displayed on the screen. In one example implementation, a diagonal swipe, or a full or partial ellipse-shape swipe gesture may cause a selection (and highlighting) of all objects that are circumscribed or bisected by the swipe gesture. According to an example implementation of the disclosed technology, if some of the selected objects were mistakenly selected, and/or if additional objects are desired for selection, a continued and/or subsequent ellipse-shape swipe gesture, tap, diagonal swipe, etc., may be utilized to refine the set of objects that were initially selected.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a processor combined with one or more additional hardware components.

Various techniques described herein may be used to perform configurable gestures in a graphical user interface. The various aspects described herein are presented as methods, devices (or apparatus), systems, and articles of manufacture that may include a number of components, elements, members, modules, nodes, peripherals, or the like. Further, these methods, devices, systems, and articles of manufacture may include or not include additional components, elements, members, modules, nodes, peripherals, or the like.

In some instances, a graphical user interface may be referred to as an object-oriented user interface, an application oriented user interface, a web-based user interface, a touch-based user interface, or a virtual keyboard. A presence-sensitive input device, as discussed herein, may be a device that accepts input by the proximity of a finger, a stylus, or an object near the device. Additionally, a presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display can have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as the personal digital assistant (PDA), satellite navigation devices, mobile phones, and video games. Further, such displays may include a capture device and a display.

Figure 3:
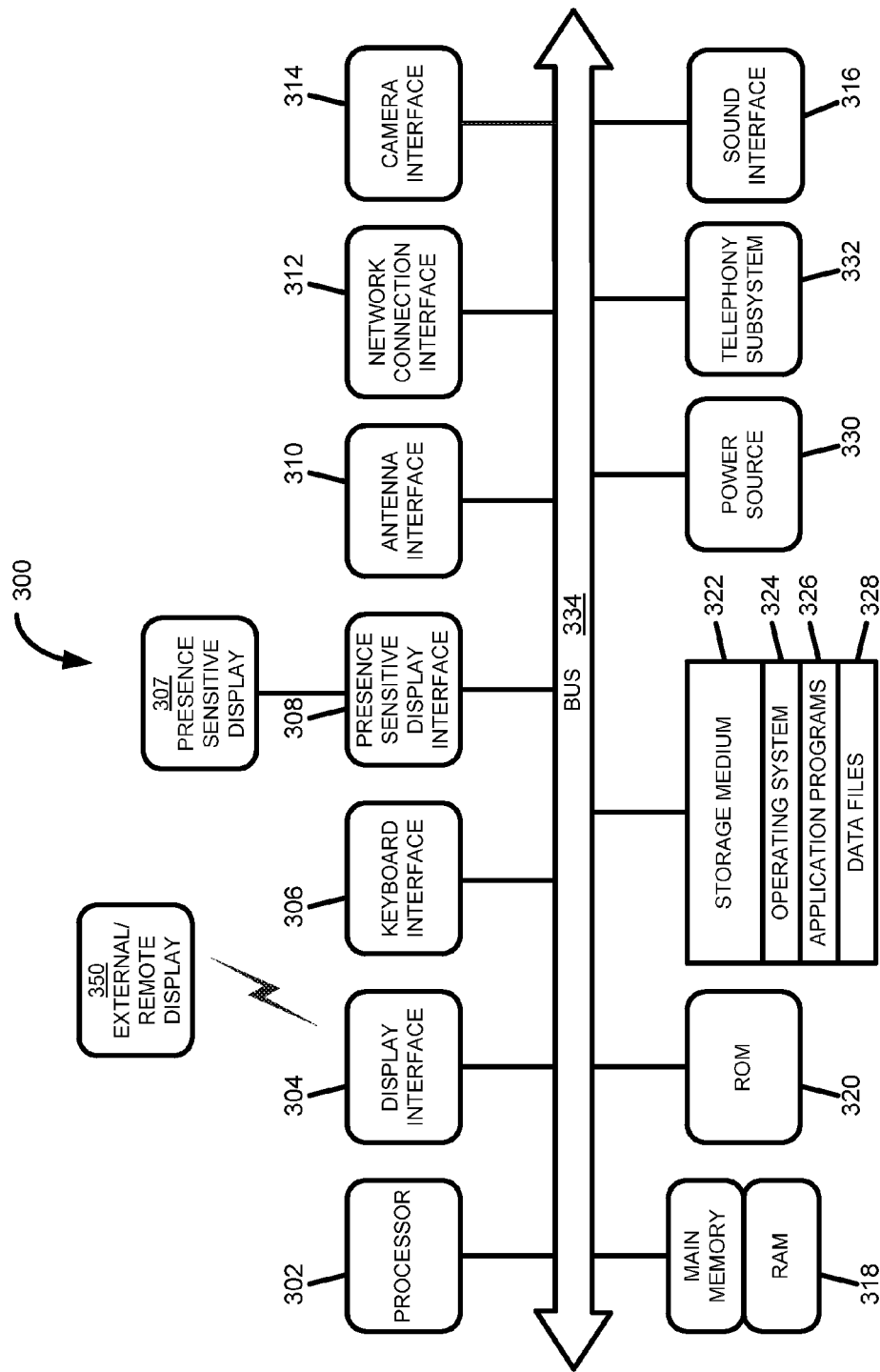
FIG. 3 depicts computing system architecture, according to an example implementation of the disclosed technology.

According to one example implementation, the terms computing device or mobile computing device, as used herein, may be a CPU, or conceptualized as a CPU (for example, the processor 302 of FIG. 3). In certain example implementations, the computing device (CPU) may be coupled, connected, and/or in communication with one or more peripheral devices, such as display, navigation system, stereo, entertainment center, Wi-Fi access point, etc. In another example implementation, the term computing device or mobile computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the mobile computing device may output content to its local display and/or speaker(s). In another example implementation, the mobile computing device may output content to an external display device (e.g., over Wi-Fi) such as a TV or an external computing system.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Presence-sensitive devices, such as touch screens, generally include a touch-sensitive layer that overlays a display monitor or screen. Various methods may be utilized to detect an input and its relative position on the on a touch screen. One method, according to an example implementation, may utilize sensors and circuitry to monitor changes in a particular state. Other embodiments may monitor changes in electrical currents or reflection of waves. For example, when a user places a finger or a stylus on the screen, the contact or proximity to the screen may induce a change that may be monitored, and a processor may interpret the induced change as an input that may then be acted upon.

Typical touch screens use a layer of capacitive material to hold an electrical charge; touching the screen changes the amount of charge at a specific point of contact. The capacitive material may be based on a two-dimensional coordinate grid (X-axis, Y-axis). The areas that are touched may create a voltage, which may then be detected as having a particular location on the coordinate grid. Specific examples of touch screen materials may include mutual capacitance, which utilizes two distinct layers of material for sensing touch and driving a voltage or current. Another example is self-capacitance, which uses one layer of individual electrodes connected to capacitance-sensing circuitry. The examples of underlying touch screen technology are for example purposes only and will be omitted from further discussion.

In general, the processor and associated operating system may detect and analyze the received touch input and provide a result based on the type of input. For example, when a user touches a touch screen surface, the processor may detect data as a position if the initial touch, the trajectory/pattern of a swipe, taps, and other gestures. In an example embodiment, the processor may utilize software stored in memory to interpret the data as commands and gestures. Input received from the touch screen may be sent to the processor as electrical impulses. The processor may utilize software to analyze the data and determine the characteristics of each touch gesture, such as the size, shape and location of the touched area on the display touch screen.

According to an example implementation of the disclosed technology, analysis software may be used to determine the type of gesture received by the touch screen. For example, a double-tap gesture made with one finger may be used to initiate a selection mode, which enables selection of content. In an example implementation, a second swipe gesture, following the double tap gesture may be used to determine the content that is selected. A swipe gesture may be in the form of a shape, wherein the content within the shape may be selected. Alternatively, the swipe gesture may be in the form of an incomplete shape or linear plane, in which the analysis software may estimate the targeted selection area and select the content within that area. In addition, the second swipe gesture may be used to modify the area to be selected by continuing the swipe gesture and moving the finger to another area of content to be selected.

Various gestures may be utilized for controlling the selection of and interaction with content, according to example implementations of the disclosed technology, and will now be described with reference to the accompanying figures.

FIG. 1A is an illustration of an example display view before and after performing a double tap gesture immediately followed by a swipe gesture, according to an example implementation of the disclosed technology. In this example, the content area(s) of the touch screen device may be organized into a plurality of rows representing separate sections of a display area. Selection, according to an example implementation, may be performed by using one finger and performing a double tap gesture immediately followed by a swipe gesture around the targeted selection area. For example, a user may begin by using an index finger, or any other finger, and performing a double tap gesture on the display. The double tap gesture may be on any portion of the display device and the time between the first and second tap should be some appreciable time apart, such as 1 second or less. In this example, the user may initiate the double tap gesture with a finger at point "A" on the display area 102A. The second on-screen swipe gesture may be performed immediately thereafter and may end at point "B" on the display area 102A. Although the position of points "A" and "B" are illustrated as being off the display area 102A, generally, the user would place their fingers on the display area directly.

Display area 102A provides a view of seven different rows of content at a first time T1 prior to user manipulation. The rows may be predefined sizes of content created by the application and executed by the operating system to provide an aesthetic viewing experience for the user. In this example, rows 1, 2, 3, 4, 5, 6 and 7 are seven rows each containing a certain amount of viewable content. The content of rows 1-7, in this example, may be filled with text and images, which may be, for example, snippets or portions of content from a website. In an example embodiment, the user may execute accessing a website address on their computing device (smartphone, PDA, tablet, personal computer, laptop, etc.), and, as a result, the list of messages 1-7 may be displayed to occupy the display area of the computing device.

Upon performing the double tap gesture at position "A" and performing a swipe gesture ending at position "B" across the surface of the display in a circular motion (as indicated by the arrows), a selection procedure may be performed to select content area 102B. In an example embodiment, The user may indicate to the display device, and by the gesture that the area enclosed by the circular swipe gesture is of interest to the user and should be selected. In an example implementation, the selected view portion (as indicated by the hatch lines in FIG. 1A, lines 1-3) may then be manipulated by the user, for example, to perform general electronic editing operations, such as cut, copy and paste.

Figure 1B:
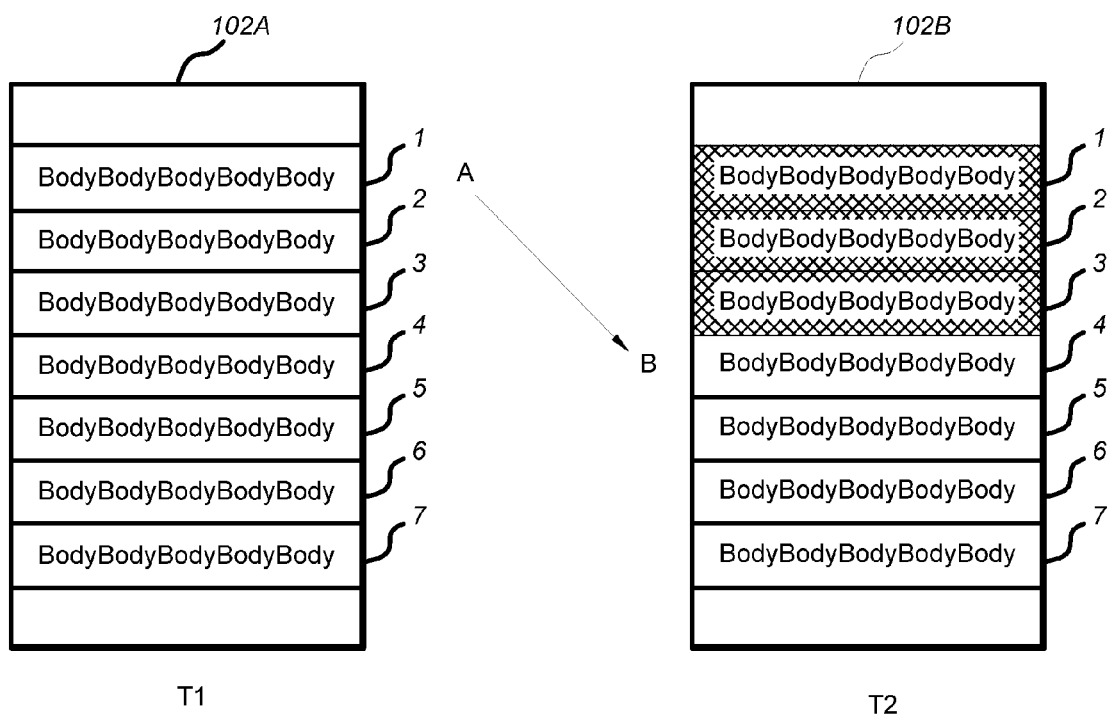
FIG. 1B is an illustrative display view transformation before (T1) and after (T2) performing a selective operation, according to an example embodiment of the disclosed technology.

FIG. 1B is an illustration of an example display view before and after performing a double tap gesture immediately followed by a swipe gesture, according to an embodiment. In this example implementation, selection may be initiated by using a finger or stylus and performing a double tap gesture immediately followed by a swipe gesture intersecting the content area. For example, a user may begin by using an index finger, or any other finger, and performing a double tap gesture on the display. The double tap gesture may be on any portion of the display device and the time between the first and second should be some appreciable time apart, such as 1 second or less. In this example, the user may initiate the double tap gesture with a finger at point "A" on the display area 102A. The second on-screen swipe gesture may be performed immediately thereafter and ends at point "B" on the display area 102B. Although the position of points "A" and "B" are illustrated as being off the display area 102B, generally, the user would place their fingers on the display area directly.

Upon performing the double tap gesture at position "A" and performing a swipe gesture ending at position "B" across the surface of the display in a linear motion (as indicated by the arrows), a selection procedure may be performed to select content area 102B (as indicated by the hatch lines in lines 1-3). The coordinates of position "A" and "B" may be utilized to calculate the selection area boundary of the target area. The coordinates of "A" may first be computed to determine the start position of the resulting selected area bounding region. The coordinates of "B" may then computed along with the coordinates of "A" to estimate the selection area boundary to be created. In an example embodiment, the user may indicated to the display device that the estimated area enclosed by the computations of positions "A" and "B" is of interest and should be selected. In an example implementation, the selected view portion (as indicated by the hatch lines in FIG. 1B, lines 1-3) may then be manipulated by the user, for example, to perform general electronic editing operations, such as cut, copy and paste.

Figure 2:
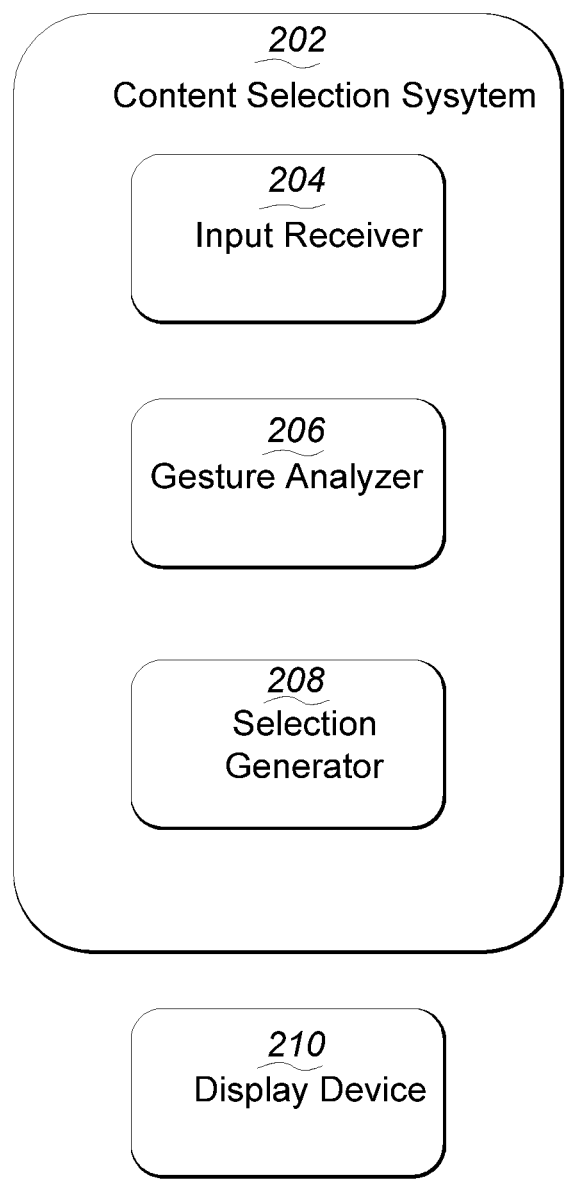
FIG. 2 is an illustration of a selection gesture system, according to an example embodiment.

FIG. 2 is an illustration of an example computer system in which embodiments may be implemented. System 202, or any combination of its components, may be part of or may be implemented with a computing device. Examples of computing devices include, but are not limited to, a computer, workstation, distributed computing system, computer cluster, embedded system, standalone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

System 202 may include an input receiver 204, a gesture analyzer 206, and a selection generator 208. System 202 may be in communication with a display device 210, which may be used to display any of the example display configurations discussed in detail above. Examples of the embodiments for example system 202 or subsystem components, such as input receiver 204, gesture analyzer 206, and/or selection generator 208, and methods or any parts or function(s) thereof may be implemented using hardware, software modules, firmware, tangible computer readable or computer usable storage media having instructions stored thereon, or a combination thereof and may be implemented in one or more computer systems or other processing systems.

In operation, the touch screen input device or display device 210 may receive a first user input double tap gesture followed by second user input swipe gesture. Both user inputs may be analyzed by gesture analyzer 206, which may initiate a selection mode based on the received inputs. The second user input swipe gesture may be received and transferred from the display device 210 to the selection generator 208, which may utilize a processor and operating system to perform computations necessary to select the content area within the path of the second on screen swipe gesture. The subsystem components, such as, the input receiver 204, gesture analyzer 206, and/or selection generator 208 may perform computational functions related to the operation of the processor and operation system to produce the selected content output, as for example, the embodiments described above.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), etc.

FIG. 3 depicts a block diagram of an illustrative computing device 300 according to an example implementation in which embodiments of the disclosed technology may be implemented. Various implementations and methods herein may be embodied in non-transitory computer readable media for execution by a processor. It will be understood that the computing device 300 is provided for example purposes only and does not limit the scope of the various implementations of the communication systems and methods.

The computing device 300 of FIG. 3 includes one or more processors where computer instructions are processed. The computing device 300 may comprise the processor 302, or it may be combined with one or more additional components shown in FIG. 3. For example, in one example embodiment, the computing device 300 may be the processor 302. In yet other example embodiments, the computing device 300 may be a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

The computing device 300 may include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured for providing data, images, and other information for an external/remote display 350 that is not necessarily physically connected to the mobile computing device. For example, a desktop monitor may be utilized for minoring graphics and other information that is presented on a mobile computing device. In certain example implementations, the display interface 304 may wirelessly communicate, for example, via a Wi-Fi channel or other available network connection interface 312 to the external/remote display 350.

In an example implementation, the network connection interface 312 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 304 may be operatively coupled to a local display, such as a touch-screen display associated with a mobile device. In another example, the display interface 304 may be configured to provide video, graphics, images, text, other information, or any combination thereof for an external/remote display 350 that is not necessarily connected to the mobile computing device. In one example, a desktop monitor may be utilized for minoring or extending graphical information that may be presented on a mobile device. In another example, the display interface 304 may wirelessly communicate, for example, via the network connection interface 312 such as a Wi-Fi transceiver to the external/remote display 350.

The computing device 300 may include a keyboard interface 306 that provides a communication interface to a keyboard. In one example implementation, the computing device 300 may include a presence-sensitive display interface 308 for connecting to a presence-sensitive display 307. According to certain example implementations of the disclosed technology, the presence-sensitive display interface 308 may provide a communication interface to various devices such as a pointing device, a touch screen, a depth camera, etc. which may or may not be associated with a display.

The computing device 300 may be configured to use an input device via one or more of input/output interfaces (for example, the keyboard interface 306, the display interface 304, the presence sensitive display interface 308, network connection interface 312, camera interface 314, sound interface 316, etc.,) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Example implementations of the computing device 300 may include an antenna interface 310 that provides a communication interface to an antenna; a network connection interface 312 that provides a communication interface to a network. As mentioned above, the display interface 304 may be in communication with the network connection interface 312, for example, to provide information for display on a remote display that is not directly connected or attached to the system. In certain implementations, a camera interface 314 is provided that acts as a communication interface and provides functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the computer processor 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an example implementation, the computing device 300 includes a power source 330 that provides an appropriate alternating current (AC) or direct current (DC) to power components. According to an example implementation, the computing device 300 includes and a telephony subsystem 332 that allows the device 300 to transmit and receive sound over a telephone network. The constituent devices and the processor 302 communicate with each other over a bus 334.

In accordance with an example implementation, the processor 302 has appropriate structure to be a computer processor. In one arrangement, the computer processor 302 may include more than one processing unit. The RAM 318 interfaces with the computer bus 334 to provide quick RAM storage to the processor 302 during the execution of software programs such as the operating system application programs, and device drivers. More specifically, the processor 302 loads computer-executable process steps from the storage medium 322 or other media into a field of the RAM 318 in order to execute software programs. Data may be stored in the RAM 318, where the data may be accessed by the computer processor 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the term computing device, as used herein, may be a processor, or conceptualized as a processor (for example, the processor 302 of FIG. 3). In this example implementation, the computing device (processor) may be coupled, connected, and/or in communication with one or more peripheral devices, such as display. In another example implementation, the term computing device, as used herein, may refer to a mobile computing device, such as a smartphone or tablet computer. In this example embodiment, the computing device may output content to its local display and/or speaker(s). In another example implementation, the computing device may output content to an external display device (e.g., over Wi-Fi) such as a TV or an external computing system.

Figure 4A:
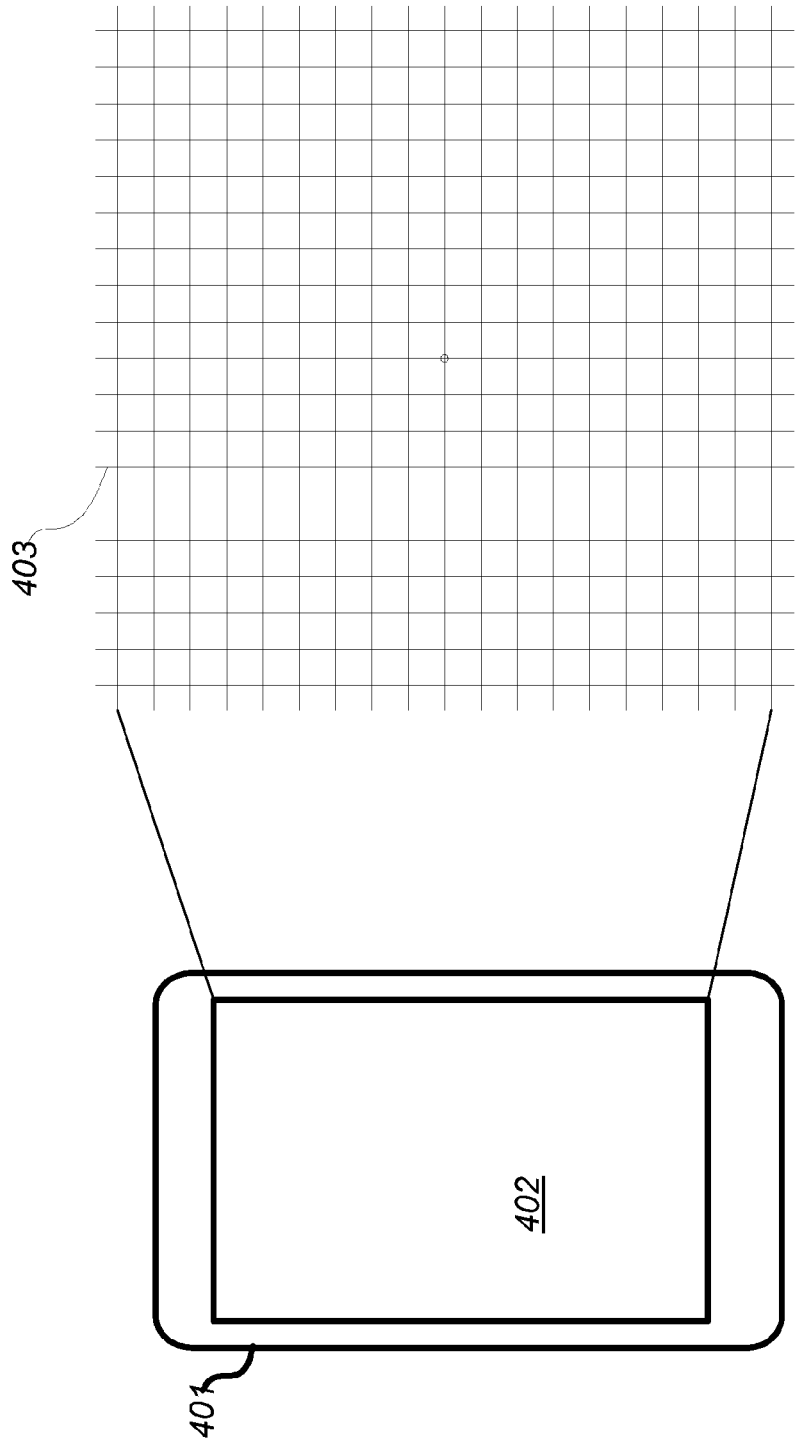
FIG. 4A depicts an illustrative capacitive grid integrated with a touch screen device of a mobile device.

FIG. 4A illustrates an example computing device 401, which may include a touch screen 402 configured to accept user input via touching operations performed by a user's fingers or other instrument. For example purposes, a touch sensor grid 403 is illustrated in an exploded view of the touch screen 402 with a touch sensor grid 403 overlaying the display area. The touch sensor grid may include many touch sensitive areas or cells which may be used to locate the area closest to the input of a user's touch.

Figure 4C:
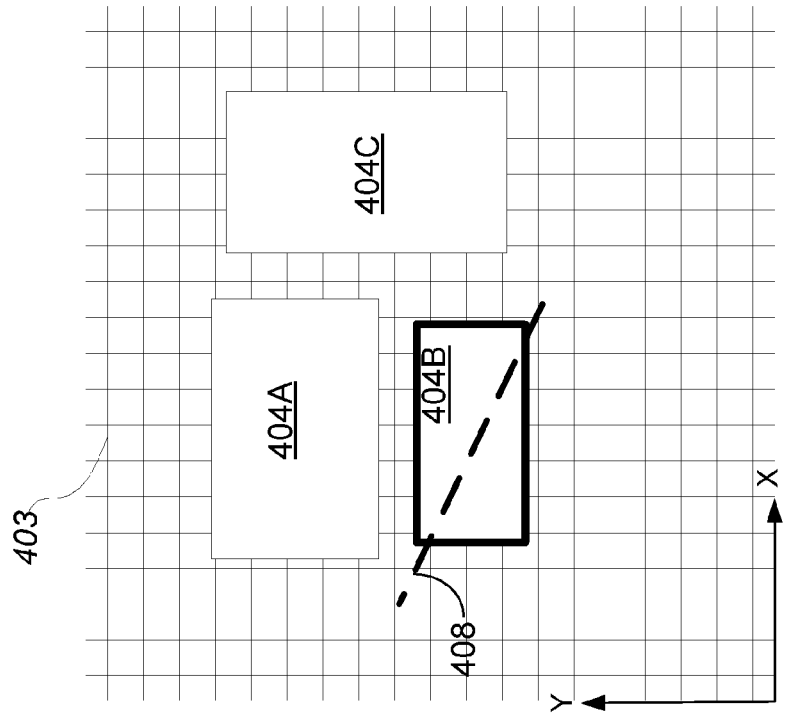
FIG. 4C illustrates an example presence-sensitive screen capacitive grid with another example gesture command applied, according to an embodiment of the disclosed technology.
Figure 4B:
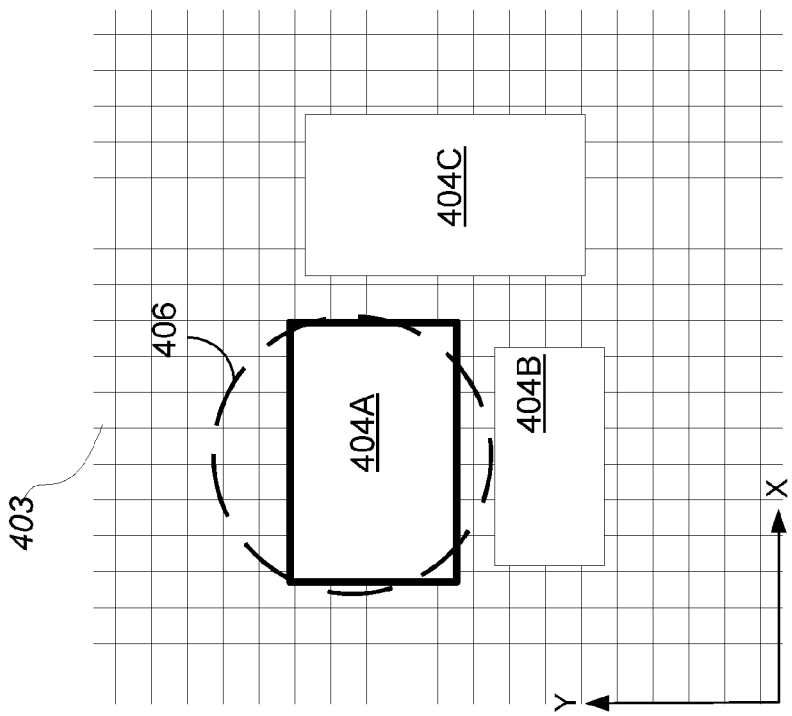
FIG. 4B illustrates an example presence-sensitive screen capacitive grid with an example gesture command applied, according to an embodiment of the disclosed technology.

FIG. 4B illustrates an example of the touch sensor grid 403 in greater detail. The grid as shown has a two-dimensional touch surface as denoted by the X and Y axes. A first content area 404A at first time T1 is illustrated by the dashed line 406. For example, after a selection of the targeted area 404A of the display is made by performing a first double tap gesture, immediately followed by a second swipe gesture, the content area 404A may be surrounded by a dashed line 406, electronically representing the path of the second swipe gesture. As shown in this example, the path of the second swipe gesture may be in the form of a circle enclosing content area 404A, indicating the content within content area 404A to be selected. Although the example illustrates the second swipe gesture as a circle, the second swipe gesture may be in the form of any shape that encompasses the targeted content area. According to an example embodiment, the system 202 (as shown in FIG. 2) and/or the computing system 300 as shown in FIG. 3 may be utilized to interpret the user's swipe operation and select the specified content area.

FIG. 4C illustrates another example of the touch sensor grid 403 in greater detail. For example, content area 404B at first time T1 may be selected by a linear swipe, as illustrated by the dashed line 408. After the user has selected the targeted area of the display, by performing a first double tap gesture, immediately followed by a second swipe gesture, the content area 404B may be intersected by a dashed line 408, electronically representing the path of the second swipe gesture. The path of the second gesture may be in the form of a line beginning and ending at two points to define content area 404B for selection. The selection area boundary may be calculated using the beginning and ending coordinates of the swipe gesture, and content within content area 404B may be selected. Although the example illustrates the second swipe gesture as a line, the second swipe gesture may be in the form of any incomplete shape that encompasses or intersects the targeted content area. According to an example embodiment, the system 202 (as shown in FIG. 2) and/or the computing system 300 as shown in FIG. 3 may be utilized to interpret the user's swipe operation and select the specified content area.

Figure 4D:
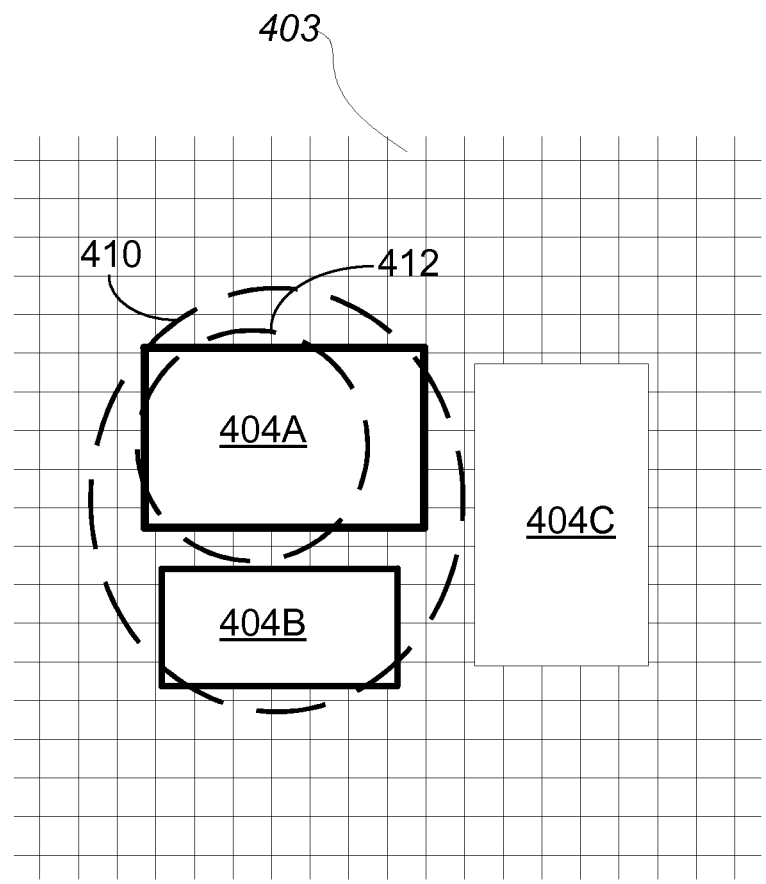
FIG. 4D depicts an example presence-sensitive screen capacitive grid with another example gesture command applied, according to an embodiment of the disclosed technology.

FIG. 4D illustrates another example of the touch sensor grid 403 in greater detail. For example, a first content area 404A and a second content area 404B will be discussed. In an example embodiment, a target area may be selected by a double tap gesture followed by a second swipe gesture. In this example, the second content area 404B (which may not be desired for selection) is enclosed by a dashed line 410 representing the path of the second swipe gesture. The path of the second gesture, in this example, is in the form of a circle enclosing both the first content area 404A and the second content area 404B. In an example embodiment, if the second content area is not desired for selection, the second gesture may continue to correct the targeted selection area by continuing the swipe gesture in a path that encloses only content area 404A, as indicated by the second dashed line 412. In this example embodiment, the content within first content area 404A may be selected, while that of the second content area 404B may be unselected. This example embodiment illustrates a correction method of the disclosed technology that may eliminate a number of correction steps when compared with traditional methods. According to an example embodiment, the system 202 (as shown in FIG. 2) and/or the computing system 300 as shown in FIG. 3 may be utilized to interpret the user's swipe operation and select the specified content area and deselect an area that was mistakenly selected.

Figure 5:
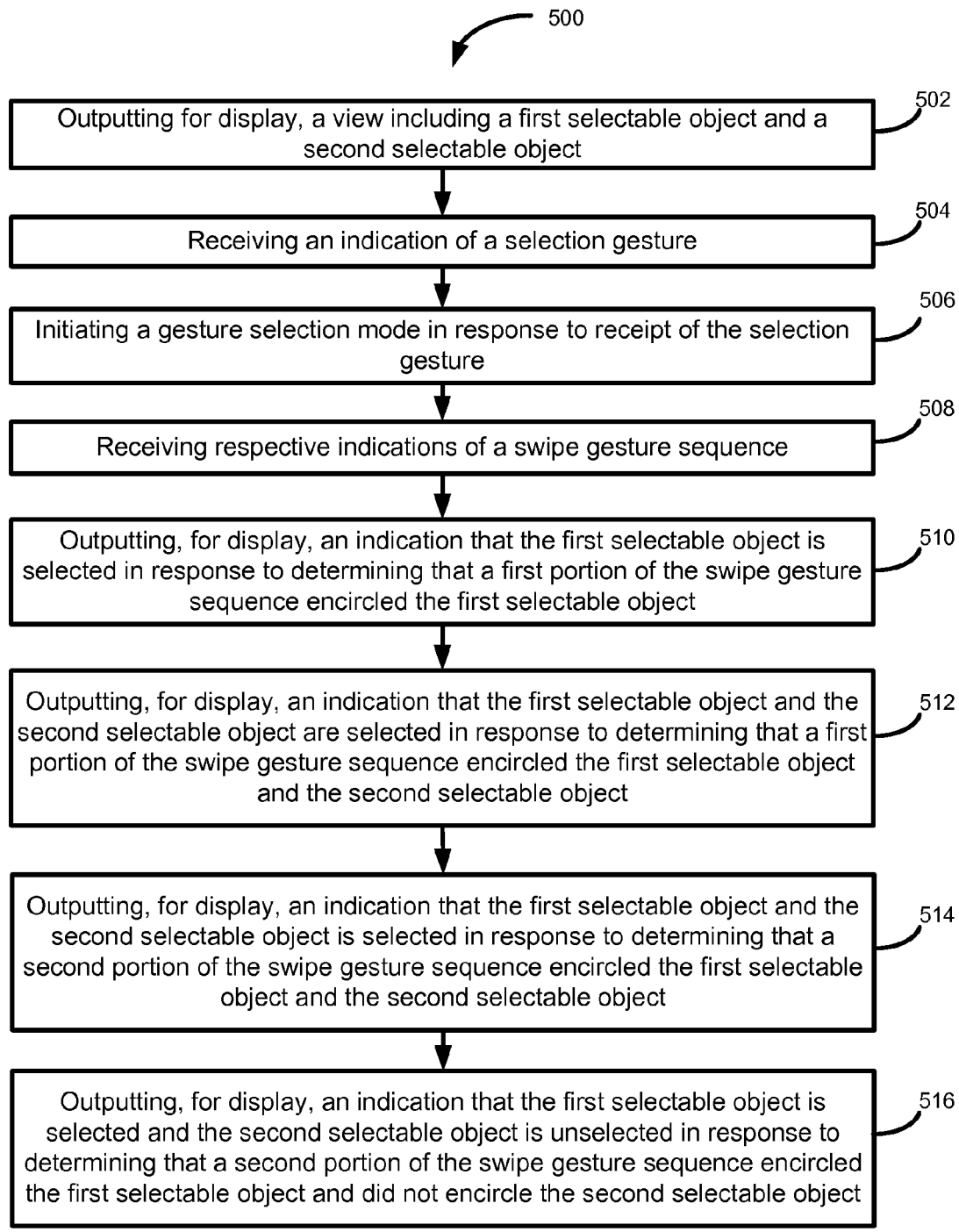
FIG. 5 is a flow diagram of a method according to an example implementation.

According to an example implementation of the disclosed technology, certain aspects or characteristics of the swipe gesture may be monitored and interpreted to provide further control. In one implementation, a curvature of a gesture may be measured by the computing device and utilized to differentiate a text selection initiation from a scroll initiation gesture. In an example implementation, a gesture may comprise a series of time-sampled points in an X-Y coordinate system that may, for example, be representative of points that the user's finger swipes over the touch screen. In an example embodiment, for each newly sampled point (or series of points, an approximating spline representation of the swipe may be updated. According to an example implementation, if the curvature of the spline exceeds a predetermined threshold, then the gesture may be interpreted as initiating a text selection and the user interface may reflect this interpretation accordingly by switching to a selection mode. In one example implementation, a cursor or other indicator may change to signal that a text selection mode has been entered. Conversely, if the curvature of the spline is determined to be below a predetermined threshold, then the gesture may be interpreted as initiating a swipe, or other screen control gesture. In one example implementation, a cursor or other indicator may change to signal that a screen control mode has been entered FIG. 5 is an illustration of a flow diagram of an example method 500, according to an example embodiment. In block 502, the method 500 includes outputting for display, a view including a first selectable object and a second selectable object. In block 504, the method 500 includes receiving an indication of a selection gesture. In block 506, the method 500 includes initiating a gesture selection mode in response to receipt of the selection gesture. In block 508, the method 500 includes receiving respective indications of a swipe gesture sequence. In block 510, the method 500 includes outputting, for display, an indication that the first selectable object is selected in response to determining that a first portion of the swipe gesture sequence encircled the first selectable object. In block 512, the method 500 may include outputting, for display, an indication that the first selectable object and the second selectable object are selected in response to determining that a first portion of the swipe gesture sequence encircled the first selectable object and the second selectable object. In block 514, the method 500 may include outputting, for display, an indication that the first selectable object and the second selectable object is selected in response to determining that a second portion of the swipe gesture sequence encircled the first selectable object and the second selectable object. In block 516, the method 500 may include outputting, for display, an indication that the first selectable object is selected and the second selectable object is unselected in response to determining that a second portion of the swipe gesture sequence encircled the first selectable object and did not encircle the second selectable object.

Certain embodiments may include determining that the swipe gesture sequence encircled a selectable object comprises determining that the gesture encircled at least a threshold portion of the selectable object. In certain example implementations, receiving the selection gesture sequence may include receiving respective indications of a first tap gesture and a second tap gesture of a double tap gesture sequence, wherein a first elapsed time between the first tap gesture and the second tap gesture of the double tap gesture sequence is within a predetermined time duration range. Certain embodiments may include outputting, by the computing device and for display, a view displaying a detected path of the swipe gesture sequence.

Certain example implementations of the disclosed technology may include receiving respective indications of a swipe gesture sequence comprising indications of an open shape swipe gesture; and outputting, for display, an indication that the selectable objects correspond to the path of the open shape swipe gesture. Certain example implementations may include detecting a curvature and trajectory of the swipe gesture sequence to distinguish object selection functions associated with the swipe gesture sequence from view navigation functions.

An example embodiment may include outputting, by the processor of the computing device and for display at the presence-sensitive screen, a view highlighting the selected one or more selectable objects. An example embodiment may include outputting, by the processor of the computing device and for display at the presence-sensitive screen, a view displaying the detected path of the swipe gesture. An example embodiment may further include determining a second elapsed time between receiving the indication of double tap gesture and receiving the indication of the swipe gesture, and terminating the initiated gesture selection mode when the second elapsed time is greater than a second predetermined time duration.

In one example embodiment, the swipe gesture may include a first closed shape, and wherein selecting the one or more of the selectable objects comprises selecting selectable objects enclosed within the first closed shape. In an example embodiment, the swipe gesture may further include a second closed shape, and wherein selecting the one or more of the selectable objects includes selecting selectable objects enclosed within the second closed shape and deselecting selected objects that are not enclosed by the second closed shape.

According to one example embodiment, the swipe gesture may be an open shape, and selecting the one or more of the selectable objects may include selecting selectable objects that correspond to the path of the swipe gesture. For example, in one embodiment, a diagonal swipe in a certain region of a presence-sensitive screen may cause selection of objects within a circle or rectangle that is bisected by the swipe. In another example embodiment, the path of the open shape may "touch" certain objects to indicate selection.

In one example embodiment, curvature and/or trajectory of the path of the second sequence of input events corresponding to the swipe gesture may be determined to further identify the swipe gesture and/or distinguish the swipe gesture from other common input that may be provided by the user. For example, this embodiment may help distinguish a selection gesture from a scrolling gesture.

In one embodiment, selecting an area enclosed or covered by the path of the swipe may include calculating a selection area boundary, wherein the boundary is defined by the path of the second on screen gesture and displaying selection markers around the selection area boundary. In another embodiment, the selection may be adjusted by a continuation of the second on screen gesture. For example, a finger or stylus may continue the second on screen gesture without lifting and the selection area boundary may be adjusted to correspond to the new path detected by the continuation of the second on screen gesture. In an example embodiment, this may be performed by selection generator 208 of content selection system 202.

According to example implementations, certain technical effects can be provided, such as creating certain systems and methods that provide enhanced object selection and/or deselection functions for use with presence-sensitive displays.

In example implementations of the disclosed technology, the computing device 300 may include any number of hardware and/or software applications that are executed to facilitate any of the operations. In example implementations, one or more I/O interfaces may facilitate communication between the computing device 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device 300. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include the computing device 300 with more or less of the components illustrated in FIG. 3.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method comprising:
outputting, by a computing device and for display, a view containing a first selectable object and a second selectable object;
receiving, by the computing device, an indication of a selection gesture;
initiating, by the computing device, a gesture selection mode in response to receipt of the selection gesture;
receiving, by the computing device, respective indications of a swipe gesture proceeding along a path;
responsive to determining that a first portion of the continuous swipe gesture proceeding along the path encircled the first selectable object and the second selectable object, outputting, for display, an indication that the first selectable object and the second selectable object are selected; and
responsive to determining that a second portion of the continuous swipe gesture proceeding along and refining the path encircled the first selectable object and did not encircle the second selectable object, outputting, for display, an indication that the first selectable object is selected and the second selectable object is unselected.

2. The method of claim 1, wherein determining that the continuous swipe gesture encircled a selectable object comprises determining that the gesture encircled at least a threshold portion of the selectable object.

3. The method of claim 1, wherein receiving the indication of the selection gesture comprises receiving respective indications of a first tap gesture and a second tap gesture of a double tap gesture sequence, wherein a first elapsed time between the first tap gesture and the second tap gesture of the double tap gesture sequence is within a predetermined time duration range.

4. The method of claim 1, further comprising outputting, by the computing device and for display, a view displaying a detected path of the continuous swipe gesture.

5. The method of claim 1, wherein the respective indications of the continuous swipe gesture comprise an open shape swipe gesture, the method further comprising:
   outputting, for display, an indication that the selectable objects correspond to the path of the open shape swipe gesture.

6. The method of claim 1, further comprising detecting a curvature and trajectory of the continuous swipe gesture to distinguish object selection functions associated with the continuous swipe gesture sequence from view navigation functions.

7. A computer-implemented method comprising:
   outputting, by a computing device and for display, a view containing a first selectable object and a second selectable object;
   receiving, by the computing device, an indication of a selection gesture;
   initiating, by the computing device, a gesture selection mode in response to receipt of the selection gesture;
   receiving, by the computing device, respective indications of a continuous swipe gesture proceeding along a path;
   outputting, for display, an indication that the first selectable object is selected in response to determining that a first portion of the swipe gesture proceeding along the path encircled the first selectable object; and
   outputting, for display, an indication that the first selectable object and the second selectable object are selected in response to determining that a second portion of the continuous swipe gesture proceeding along and refining the path encircled the first selectable object and the second selectable object.

8. The method of claim 7, wherein determining that the continuous swipe gesture encircled a selectable object comprises determining that the continuous swipe gesture encircled at least a threshold portion of the selectable object.

9. The method of claim 7, wherein receiving the indication of the selection gesture comprises receiving respective indications of a first tap gesture and a second tap gesture of a double tap gesture sequence, wherein a first elapsed time between the first tap gesture and the second tap gesture of the double tap gesture sequence is within a predetermined time duration range.

10. The method of claim 7, further comprising outputting, by the computing device and for display, a view displaying a detected path of the continuous swipe gesture.

11. The method of claim 7, wherein the respective indications of the continuous swipe gesture comprise an open shape swipe gesture, the method further comprising:
    outputting, for display, an indication that the selectable objects correspond to the path of the open shape swipe gesture.

12. The method of claim 7, further comprising detecting a curvature and trajectory of the continuous swipe gesture to distinguish object selection functions associated with the swipe gesture sequence from view navigation functions.

13. A system comprising:
    a presence-sensitive display;
    one or more processors in communication with the presence-sensitive display; and
    at least one memory in communication with the one or more processors and configured for storing data and instructions that, when executed by the at least one processor, cause the system to:
      output, for display, a view including a first selectable object and a second selectable object;
      receive an indication of a selection gesture;
      initiate a gesture selection mode in response to receipt of the selection gesture;
      receive respective indications of a continuous swipe gesture proceeding along a path;
      output, for display, an indication that the first selectable object is selected in response to determining that a first portion of the continuous swipe gesture proceeding along the path encircled the first selectable object;
      output, for display, an indication that the first selectable object and the second selectable object are selected in response to determining that a first portion of the continuous swipe gesture proceeding along the path encircled the first selectable object and the second selectable object;
      output, for display, an indication that the first selectable object and the second selectable object are selected in response to determining that a second portion of the continuous swipe gesture proceeding along the path encircled the first selectable object and the second selectable object; and
      output, for display, an indication that the first selectable object is selected and the second selectable object is unselected in response to determining that a second portion of the continuous swipe gesture proceeding along and revising the path encircled the first selectable object and did not encircle the second selectable object.

14. The system of claim 13, wherein determining that the continuous swipe gesture encircled a selectable object comprises determining that the gesture encircled at least a threshold portion of the selectable object.

15. The system of claim 13, wherein receiving the indication of the selection gesture comprises receiving respective indications of a first tap gesture and a second tap gesture of a double tap gesture sequence, wherein a first elapsed time between the first tap gesture and the second tap gesture of the double tap gesture sequence is within a predetermined time duration range.

16. The system of claim 13, wherein the one or more processors are configured to detect a path of the continuous swipe gesture, and output, for display, a view of the detected path of the continuous swipe gesture.

17. The system of claim 13, wherein the respective indications of the continuous swipe gesture comprise an open shape swipe gesture, and wherein the one or more processors are further configured to:
    output, for display, an indication that the selectable objects correspond to the path of the open shape swipe gesture.

18. The system of claim 13, wherein the one or more processors are configured to detect a curvature and trajectory of the continuous swipe gesture to distinguish object selection functions associated with the swipe gesture sequence from view navigation functions.

19. A non-transitory computer-readable medium that stores instructions that, when executed by at least one processor in a system, cause the system to perform a method comprising:
    outputting, for display, a view including a first selectable object and a second selectable object;
    receiving an indication of a selection gesture;
    initiating a gesture selection mode in response to receipt of the selection gesture;
    receiving respective indications of a continuous swipe gesture proceeding along a path;

outputting, for display, an indication that the first selectable object is selected in response to determining that a first portion of the continuous swipe gesture proceeding along the path encircled the first selectable object;

outputting, for display, an indication that the first selectable object and the second selectable object are selected in response to determining that a first portion of the continuous swipe gesture proceeding along the path encircled the first selectable object and the second selectable object;

outputting, for display, an indication that the first selectable object and the second selectable object are selected in response to determining that a second portion of the continuous swipe gesture proceeding along the path encircled the first selectable object and the second selectable object; and outputting, for display, an indication that the first selectable object is selected and the second selectable object is un selected in response to determining that a second portion of the continuous swipe gesture proceeding along and revising the path encircled the first selectable object and did not encircle the second selectable object.

20. The computer-readable medium of claim 19, wherein determining that the continuous swipe gesture encircled a selectable object comprises determining that the gesture encircled at least a threshold portion of the selectable object.

21. The computer-readable medium of claim 19, wherein receiving the indication of the selection gesture comprises receiving respective indications of a first tap gesture and a second tap gesture of a double tap gesture sequence, wherein a first elapsed time between the first tap gesture and the second tap gesture of the double tap gesture sequence is within a predetermined time duration range.

22. The computer-readable medium of claim 19, further comprising outputting, by the computing device and for display, a view displaying a detected path of the continuous swipe gesture.

23. The computer-readable medium of claim 19, wherein the respective indications of the continuous swipe gesture comprise an open shape swipe gesture, the method further comprising:

outputting, for display, an indication that the selectable objects correspond to the path of the open shape swipe gesture.

24. The computer-readable medium of claim 19, further comprising detecting a curvature and trajectory of the continuous swipe gesture to distinguish object selection functions associated with the swipe gesture sequence from view navigation functions.

* * * * *